D. D. PARMELEE.
Working Scrap-Iron or other Metals into Ingots.
No. 146,092.             Patented Dec. 30, 1873.
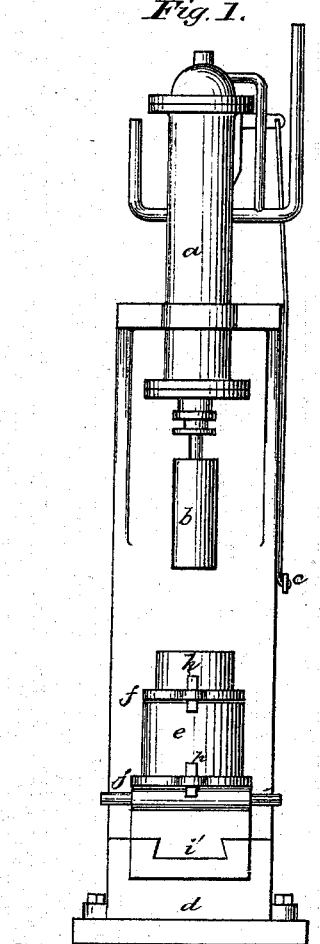
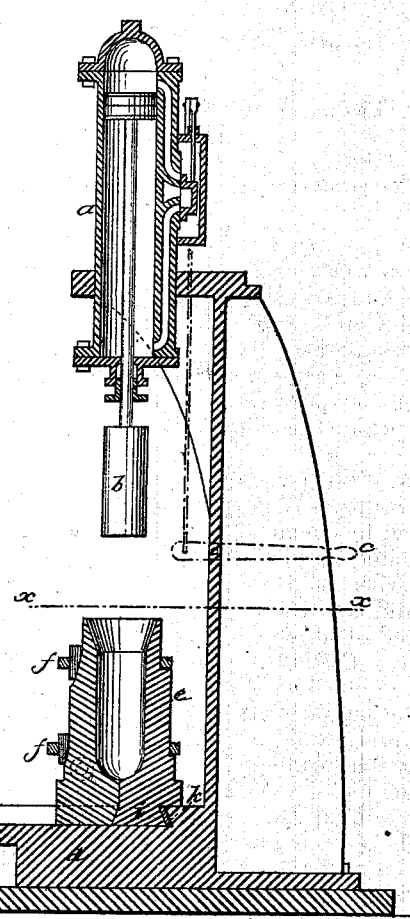
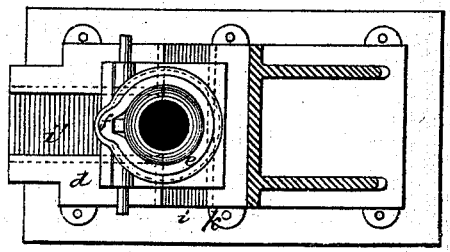

UNITED STATES PATENT OFFICE.

DUBOIS D. PARMELEE, OF NEW YORK, ASSIGNOR TO CHARLES RUNYON, OF YONKERS, AND FRANCIS ROBINSON, OF NEW YORK, N. Y.

IMPROVEMENT IN WORKING SCRAP IRON OR OTHER METALS INTO INGOTS.

Specification forming part of Letters Patent No. 146,092, dated December 30, 1873; application filed December 22, 1873.

*To all whom it may concern:*

Be it known that I, DUBOIS D. PARMELEE, of the city, county, and State of New York, have made a new and useful Improvement in the Manufacture of Scrap Metal into Dense Solid Ingots, for the purpose of welding or melting them, of which the following is a specification:

My improvement specially relates to the thin sheet-iron scraps of plate-tin after the tin has been removed by chemical means. These iron scraps are bulky, and present great surface, compared with their weight, to the atmospheric air, and are therefore rapidly oxidized when heated to either a welding or melting temperature. By my improvement this wastage is prevented. The scraps are reduced in bulk to forms of ingots of size easily handled in the welding process, or fitting and filling the form of crucibles commonly employed in the manufacture of cast-steel.

The condensation of the iron scraps, and forming of them into ingots of the desired shape, are accomplished by a steam-hammer and a mold specially designed for the purposes, as shown in the accompanying drawings.

Figure 1 is a front view of the steam-hammer and mold. Fig. 2 is a central longitudinal cross-section, in part, of Fig. 1. Fig. 3 is a plan view of the anvil and die on line *x x*.

Like letters refer to the same parts.

*a* represents the steam-cylinder; *b*, the hammer; *c*, the lever for opening and closing the valve, regulating the admission of the steam, similar to forge-hammers now in use. *d* is the anvil, which supports the die or mold *e*, which is made in sections to facilitate the extraction of the ingot. This mold or die is properly and firmly secured against parting, in the operation of forming ingots, by means of rings or bands *f f*, which are secured by means of keys *h h*. On the base of each half of the mold or die is a dovetailed projection, which fits into grooves *i* and *i'* holding the mold or die firmly in position. *k* is a key, which locks the back section of the mold or die. The face of the hammer *b* is slightly concave, and its diameter one-eighth of an inch less than the interior of the mold, so as to leave a space of one-sixteenth of an inch between it and the walls of the mold *e*.

When the mold or die has been adjusted in the grooves of the anvil, and the rings or bands keyed so as to firmly hold its parts in their position, about four pounds of the scrap-iron are placed over the mouth of the mold. The hammer is slowly forced upon them, when they are crowded downward a few inches. The hammer is again elevated, and in the same manner, except with increased force, brought to act upon the scraps. A few blows consolidate them at the bottom of the mold, and as there is a small margin or space between the hammer and walls of the mold, there is a corresponding flange projecting all around the surface of the consolidated scraps. Another charge is next added in precisely the same manner as above described, and thus charge after charge is added until the mold is filled. The flange, above described, on the last part or top of the condensed mass is then pounded over by an iron bar, and smoothly hammered down by the steam-hammer. The iron bands are next unkeyed and removed, and the front part of the mold removed by sliding it in its groove. The ingot is then readily detached from the other stationary part of the mold. A proper proportion of these ingots is about five and one-half inches in diameter and fourteen inches in length, weighing sixty pounds, and fitting a No. 40 plumbago crucible employed in making cast-steel.

When the ingots are welded into wrought bar-iron, they are treated precisely in the manner practiced and well known in welding short cuttings of bar scrap-iron into shafts and other large forms.

In converting the ingots into cast-steel, they are placed in the crucibles they are designed to fill, and the charcoal, pyrolucite, and other powdered ingredients, employed commonly for like purpose, are placed around it, there being ample room for them in the swell of the crucible. The crucibles are next placed in the furnace, the ingots melted into cast-steel, and poured into molds, and afterward forged into bars.

Although I have confined my description to the thin sheet-iron scraps of tin-plate cuttings, my improvements are equally applicable to other sheet-iron scraps, as those of stove-pipe cuttings, and also cuttings of wire. They are equally applicable to other metallic scraps, as those of copper, brass, and zinc.

Having thus described my improvement, what I claim as my invention, and desire to secure by Letters Patent, is—

1. The method herein described for consolidating iron or other scrap metal cuttings, by hammering the scrap into a mold in layers, substantially as described.

2. An ingot of iron or other metal cuttings, formed by hammering the scrap into a mold, substantially as specified.

3. The mold, provided with a conical bottom and flaring top, and attached to the base by means of dovetails or equivalent devices, as and for the purpose set forth.

DUBOIS D. PARMELEE.

Witnesses:
   CHS. RUNYON,
   WM. H. WOOD, Jr.